United States Patent Office 3,830,772
Patented Aug. 20, 1974

3,830,772
THERMO-SETTING MOULDING COMPOSITIONS AND PROCESSES FOR THEIR MANUFACTURE
Wolfram Busch, Wiesbaden-Biebrich, and Stefan Mullner, Niederhofheim, Germany, assignors to Chemische Werke Albert Aktiengesellschaft, Wiesbaden, Germany
No Drawing. Filed May 18, 1972, Ser. No. 254,489
Claims priority, application Germany, May 19, 1971, P 21 24 939.8
Int. Cl. C08f 43/08
U.S. Cl. 260—40 R                    15 Claims

ABSTRACT OF THE DISCLOSURE

Thermo-setting molding composition comprising (a) an unsaturated polyester, (b) a copolymerisable vinyl monomer, (c) a filler selected from the group consisting of an inorganic, an organic filler, a reinforcing agent and mixtures thereof, (d) a catalyst and (e) a copolymer of $\alpha$-methylstyrene and acrylonitrile. A process for the continuous manufacture of molding compositions, and molded articles obtained by hardening such molding compositions.

This invention is concerned with thermo-setting molding compositions on the basis of unsaturated polyesters as well as with a process for their manufacture.

We have found that thermo-settling molding compositions comprising an unsaturated polyester, a copolymerizable vinyl monomer, an inorganic and/or organic filler and/or reinforcing agent, a catalyst and a copolymer of $\alpha$-methylstyrene and acrylonitrile (and, if desired, mold release and lubricating agents) result in moldings with particularly favourable properties.

The copolymer contained in the molding compositions preferably contains 65 to 82 percent by weight of $\alpha$-methylstyrene and 35 to 18 percent by weight acrylonitrile. Its molecular weight is generally between 50,000 and 500,000, preferably between 100,000 and 300,000 (means molecular weight established by gel chromatography on a polystyrene gel).

Surprisingly, it was found that the presence of this copolymer causes considerable improvement in the surface properties, particularly a very excellent surface gloss of the moldings. Moreover the moldings do not shrink and they do not distort so that they can be readily lacquered and used in combination with other materials, for example with steel sheet.

The amount of copolymer is generally 3 to 50, preferably 5 to 20 percent, by weight calculated on the total amount of polyester, vinyl monomers and copolymer. Especially favourable results are obtained if the relative proportion of the quantity ranges of unsaturated polyester to copolymerisable vinyl monomers to copolymer is (10, especially 20 to 80) to (10 to 70) to (3 to 50), the total amount of these three components always being 100. Within the given ranges, depending on the required criteria of processability and surface finish, infinite variation is possible.

The unsaturated polyesters in general have a molecular weight of 500 to 3,000. Especially good results are obtained if they have a reactivity of an olefinic double bond of 230 to 400, preferably 240 to 260, g. polyester resin and an acid and an OH number of 20 to 50 each, preferably 30 to 40. Their preparation can be effected in a conventional manner by a melt or solvent process, a carrier possibly being used additionally in the last named case. They are prepared from olefinically unsaturated and/or saturated polybasic carboxylic acids or their anhydrides and polyhydric alcohols. As saturated carboxylic acids are to be understood those that do not contain olefinic double bonds.

Suitable carboxylic acids include maleic, fumaric, itaconic, citraconic, phthalic, isophthalic, terephthalic, tartaric, adipic, sebacic, azelaic, suberic acid, naphthalene dicarboxylic acids and cyclohexane dicarboxylic acid or their anhydrides in so far as they exist; as saturated acids, phthalic acid and isophthalic acid are preferred. Suitable alcohols include for example diols, with 2 to 10 carbon atoms, such as ethylene glycol, propane diol-1,2 or -1,3, butanediol - 1,4, butenediol - 1,4; dimethylpropanediol-1,3, diethylene glycol, dipropylene glycol, dibutylene glycol, dimethylolcyclohexane, dimethylolbenzene, bis-(hydroxyethyl)-diphenylolpropane, bis-(hydroxypropyl)-diphenylolpropane, glycerol monoalkylether and glycerol monoacetate. Preferably however ethylene glycol and propane diol are used.

The polyesters can be prepared in a conventional manner. Preferably, unsaturated polyesters are used whose acid component contains 20 to 60, preferably 30 to 50, mol percent phthalic acid or isophthalic acid and/or whose alcohol component contains 50 to 100, preferably 60 to 80, mol percent propane diol-1,2 and/or 2,2-dimethylpropane diol.

The monomer should preferably be a solvent for the unsaturated polyester and the copolymer and should contain the group $H_2C{=}C{<}$. Styrene, the various vinyl toluenes and $\alpha$-methylstyrene are preferred. Other alkyl styrenes, such as tert.-butylstyrene, divinylbenzene, monomeric mono- or diacrylates, for example lower alkyl esters of methacrylic or acrylic acid and ethane-, propane- or 1,3-butanediol methacrylate or -diacrylate can however also be used. In these, the alkyl radical generally contains 1 to 8 carbon atoms and is preferably methyl, ethyl, propyl or butyl. $\alpha$-Methylstyrene is generally used in mixtures of monomers. The ratio of unsaturated polyester to the monomers is preferably within the range 70:30 to 10:70.

The copolymerisable vinyl monomer may be present in an amount of 30 to 70, preferably of 40 to 60, percent by weight calculated upon the total amount of polyester, vinyl monomers and copolymer. In the processing of the molding compositions, it is of advantage if, for example, a 5 to 70 percent, preferably 10 to 30 percent, solution of the copolymer is already present in the vinyl monomer which, for example in the case of styrene, has a viscosity (rotation viscosity) of 20° C. of not more than 10,000 centipoises. The solution is maintained also in combination with fillers or reinforcement substances and this is indicated by the fact that under very high pressures, the polymer solution can again be pressed out of the mixture.

Curing of the molding compositions is effected under the influence of heat, pressure and standard peroxide catalysts such as dibenzoyl peroxide, tert.-butylperbenzoate or -peroctoate, dicumylperoxide, cyclohexanonperoxide, di-t-butylperoxide, 2,5 - (dimethyl)-2,5-(di-t-butyl-peroxy)-hexane and the like, which may, for example, be present in an amount of weight of 0.05 to 5.5 calculated on 100 parts by weight polyester.

In general, the molding compositions also contain internal and external anti-friction and mould release agents, particularly metal salts or fatty acids, for example zinc, calcium, aluminium or magnesium stearate, as well as high molecular weight fatty acid esters, partially saponified esters, depolymerised polyethylene, for example with a mol weight of 5,000 to 50,000 and silicones.

In the molding compositions, inorganic minerals may be present in the form of oxides, hydroxides, carbonates, sulphates, silicates, for example calcium carbonate, magnesium oxide, Ca-Al-silicate (so-called kaolin earths). Additionally, they may contain in general, to increase the mechanical strength and the modulus of elasticity, inorganic or organic fibers, fibre fleece or knitted structures, for example glass or asbestos fibres or fleece, or also polyacrylonitrile and polyethylene terephthalate filaments or fleece or combinations of such materials. Moreover, standard additions such as pigments, dyestuffs, inhibitors and accelerators may be used. The amount of the filler and reinforcement substances may be 10 to 80 percent by weight calculated on the polyester.

The molding compositions based on the above substance combinations can be further processed by different methods. Molding compositions containing cut inorganic or organic fibres may be prepared discontinuously in such a manner that in a kneader, for example one with sigma blades, the solutions of the unsaturated polyester and of the copolymer, always with the copolymerisable monomer, are combined with one another and then mixed with the catalyst, fillers, mold release and possibly anti-friction preparations and possibly other standard additions to give a low viscosity homogenous paste, fibrous fillers then being added. There results a fibrous voluminous molding composition which, after a short storage period in closed vessels, has a non-sticky, high viscosity consistency and which can be processed in this form, for example by pressing at 140 to 160° C., preferably into moldings that have little shrinkage, do not distort and exhibit a qualitatively high-grade smooth surface.

Molding compositions of the above consistency can also be produced, in the composition stated, continuously in an extruder. For this purpose, a mixture of all the dry components is introduced into the machine and the previously mixed solutions of the unsaturated polyester and the copolymer in the copolymerisable monomer added to the dry mixture, using a pump continuously for example.

To prepare fleece-like moldings, the first-named method can be modified in that the low viscosity paste described is used as impregnating medium for fibre fleeces, covering the fleece soaked with paste on both sides with suitable films such as those from polyethylene or polyethylene terephthalate. After a short period of storage, the flow characteristic, that is to say, the high viscosity necessary for further processing, of the impregnated fleece has been attained and the molding composition prepared in this way can be used with advantage for the preparation of large surface parts that are resistant also to mechanical stress. The surfaces of these parts are smooth and plain and have outstanding gloss so that they may be used as visible parts even without any further aftertreatment; they can however also be readily lacquered or coated by some other means. Since these parts do not distort, they can be combined with other materials, for example steel sheet.

The molding produced on the basis of such low shrinkage molding compositions under the action of heat and pressure, do not distort and are distinguished by their outstanding surface finish. Also, in respect of mold design and surface finish, they are a true replica of the mold used. On the other hand, moldings from corresponding conventional curable polyester molding compositions have an undulating and grained surface, which deviates from the mold design, with the well known shrinkage and cavity effects (depressions). The structure of the glass fibre bundles is quite distinct. Under certain circumstances this may necessitate (after molding because of the frequently arising distortion) clamping in cooling gauges, especially with large surface parts or those with great differences in wall thickness or when using injection molding or casting techniques.

Moldings prepared from the molding compositions in accordance with the invention are therefore suitable, for the previously stated reasons, particularly for visible building components because their outstanding surface finish satisfies highest demands. Another advantage resides in the fact that moldings from compositions coloured with pigments do not require post-grinding, polishing or lacquering. Moreover, the molding compositions in accordance with the invention are used with advantage whenever the requirements with regard to dimensional and design fidelity cannot be achieved, or only with difficulty, with conventional curable polyester long-fibre molding compositions especially if subsequently there is to be surface improvement, for example through lacquering, metallising, (for example through vacuum coating or galvanising) or printing, although, because of the high gloss surface, this is frequently not desired.

Since such finishing processes emphasise irregularities, including optical ones, in the surface of moldings, usually even more strongly than in the untreated part, moldings from the compositions in accordance with the invention are suitable, in contrast to conventional ones, particularly for such surface finishing processes, especially also for economic reasons, because pre-treatment of the parts, for example through stiffening, polishing or priming, is unnecessary.

Because of their good mechanical strength, heat resistance, rigidity, dimensional stability, very good electrical properties and easy processing, the moldings mentioned can be used with advantage, for example in the following fields: vehicle construction, for example for chassis components, headlight casings and reflectors, dashboards and components, fittings, rear lights, covers; domestic implements such as sewing machine components, coffee mills, universal cutters, juice extractors, components for dish washers and washing machines, refrigerators, radio and television equipment, stove edging, projectors, cameras, cine cameras; sanitary equipment and fittings; office equipment and machinery, for example typewriter frames and covers; furniture, for example chairs, table tops, school furniture and furniture fittings; in the building and plumbing field, for example for door and window handles, covers and window sills, lamp casings; transport and packaging containers, for example tins and boxes.

In order that the invention may be well understood the following examples are given by way of illustration only:

EXAMPLES

Example according to the invention 20 parts by weight of a 70 percent by weight solution of a polyester (from 40 mol percent maleic anhydride, 10 mol percent phthalic anhydride and 50 mol percent 2,2-dimethylpropandiol-1,3 with a degree of unsaturation of 250 g. resin per reactive double bond and an acid value of 20 to 50) in styrene are dispersed in one another with 10 parts by weight of a 30 percent by weight solution of a copolymer from 27 percent by weight acrylonitrile and 73 percent by weight α-methylstyrene with a molecular weight of 50,000 to 500,000 in styrene. The low-viscosity dispersion obtained is well mixed in a non-heated mixer with sigma kneaders with one part by weight calcium stearate, one part by weight magnesium oxide, two parts by weight t-butylperbenzoate (50 percent by weight on an inorganic carrier material) and 26 parts by weight ground limestone. To the low viscosity paste, 30 parts by weight of cut (6 mm. long) glass fibres, finished with a vinyl-silane size are finally added. After a kneading period of approximately five minutes, a straw-like composition is obtained which can be cured at 160° C. and under a pressure of 100 kg. per square cm in two minutes to give articles with a high surface gloss, which have only very low shrinkage and which therefore neither distort nor acquire an undulating surface. Moreover, the glass fibre bundles visible in moldings from a molding composition without the addition of the copolymer applied in an analogous manner, entirely disappear in moldings from this composition in accordance with the invention.

The surface finish is determined by means of a Goniophotometer in that the reflection (in percent) of an amount of light beamed at a given angle is determined in comparison to that amount of light reflected from a metal plate polished to a high gloss. A reflection of 63 to 68 percent is obtained.

The surface finish of the moldings prepared from the molding compositions is determined by means of a so-called "Perth-O-Meter" through scanning of the surface of the molding, continuous deflections being recorded. The surface roughness is the maximum distance from the projections to the depressions in the surface. It is possible in this way to measure with one piece of apparatus the surface undulation, which is particularly great in the case of the molding compositions not modified with polymer (see comparative Example 1a) and the surface roughness successively. In the molding compositions in accordance with the invention, the surface undulation in comparision to the molding compositions from the same polyesters without the addition of the copolymers is greatly reduced and is shown by measurements with these surface scanning instruments. The results of the other mechanical tests of the moldings are given in the Table.

Comparative Example 1a

One proceeds as in Example 1 without however, the copolymer. The sheets obtained from the straw-like molding composition show an excellent surface from which, because of the great resin shrinkage, the glass fibres protrude markedly. Moreover, the surface is very undulating and the shrinkage in all three dimensions makes it impossible to incorporate such components in combinations with metal construction without distortion. If such articles are to be used in practice nevertheless, they must be cooled in a gauge after curing and post machined and they must be ground before any lacquering is carried out (test values—see Table).

Comparative Example 2

If Example 1 is modified so that in place of the copolymer used there, a copolymer from methyl methacrylate and ethyl acrylate in weight ratio 87:13 is used and in place of the polyester resin described there, one from 1.0 mol maleic anhydride and 0.1 mol propylene glycol with a degree of unsaturation of 156 and an acid value of 52 is employed, then, after curing as in Example 1, articles with low undulation and low shrinkage but with inferior surface finish are obtained (test values—see Table).

Comparative Example 3

If Example 1 is modified so that a copolymer from 27 weight percent acrylonitrile and 73 weight percent styrene is used, then, after curing, articles with low undulation and low shrinkage but inferior surface finish are obtained (test values—see Table).

TABLE.—TEST VALUES

| Measurement | Example | | | |
|---|---|---|---|---|
| | 1 | 1a | 2 | 3 |
| Reflection in percent | 63–68 | 61–66 | 30–38 | 45–55 |
| Flexural strength in kg./cm.² | 920 | 700–800 | 870 | 675 |
| Impact strength in kg. cm./cm.² | 26 | 18–23 | 15 | 23 |
| Notch impact strength in kg. cm./cm.² | 27 | 17–21 | 13 | 21 |
| Mold stability according to Martens in °C | 180 | 158 | 150 | 146 |
| Processing shrinkage in percent | 0.18 | 0.4 | 0.16 | 0.09 |

What is claimed is:

1. A thermo-setting molding composition comprising (a) an unsaturated polyester of a polycarboxylic acid and a polyhydric alcohol, (b) a copolymerisable vinyl monomer (c) a filler selected from the group consisting of an inorganic, an organic filler, a reinforcing agent and mixtures thereof, (d) a catalyst and (e) a copolymer of α-methylstyrene and acrylonitrile.

2. A composition as claimed in claim 1 wherein the copolymer comprises 65 to 82% by weight α-methyl-styrene and 35 to 18% by weight acrylonitrile.

3. A composition as claimed in claim 1 wherein the copolymer has a molecular weight of 50,000 to 500,000.

4. A composition as claimed in claim 1 wherein the unsaturated polyester has a reactivity of one olefinic double bond per 230 to 400 g. polyester resin and has an acid number and a OH-number of 20 to 50 each.

5. A composition as claimed in claim 1 wherein the compolymer is present in a quantity of 3 to 50% by weight and the vinyl monomer is present in a quantity of 30 to 70% by weight, each based on the overall composition of polyester, vinyl monomer and copolymer.

6. A composition as claimed in claim 1 wherein the polyester has a molecular weight of from 500 to 3,000 and contains 20 to 60 mol percent of an acid selected from the group consisting of phthalic acid, isophthalic acid, and mixtures thereof in the acid component.

7. A composition as claimed in claim 1 wherein the unsaturated polyester contains 50 to 100 mol percent of a glycol selected from the group consisting of propylene glycol-1,2, neopentyl glycol and mixtures thereof.

8. A composition as claimed in claim 1 wherein the ratios of unsaturated polyester to copolymerisable vinyl monomer to copolymer are in the ranges (10 to 80):(10 to 70):(3 to 50), the sum of the three components being always 100.

9. A composition as claimed in claim 1 wherein the copolymerisable monomer is selected from the group consisting of styrene, α-methylstyrene, an alkylstyrene with 1 to 8 C-atoms in the alkyl group and mixtures thereof.

10. A composition as claimed in claim 1 wherein the unsaturated polyester and the copolymer are present as a 5 to 70% by weight in solution in the copolymerisable vinyl monomer.

11. A composition as claimed in claim 1 wherein the weight ratio of unsaturated polyester to the copolymerisable monomer is from 70:30 to 10:70.

12. A process for the continuous manufacture of molding compositions as claimed in claim 1 which comprises continuously feeding a mixture of all dry components of the molding composition to an extruder and continuously adding thereto the combined solutions of the copolymer and the unsaturated polyester in the copolymerisable monomer.

13. A molded article obtained by curing molding composition as claimed in claim 1.

14. A molding composition of claim 1 comprising:
(a) an unsaturated polyester of a polycarboxylic acid with a polyhydric alcohol having a molecular weight of 500–3,000, a reactivity of an olefinc bond of 230 to 400 and a hydroxyl number of 20 to 50
(b) a vinyl monomer copolymerizable with the polyester
(c) a filler
(d) a catalyst
(e) a copolymer of 65–82 weight percent α-methyl styrene and 35 to 18 weight percent acrylonitrile having a molecular weight of 50,000 to 500,000 wherein the ratio of the polyester to the vinyl monomer to the copolymer is in the range of 10 to 80:10 to 70:3 to 50.

15. A molding composition of claim 1 comprising:
(a) an unsaturated polyester of a polycarboxylic acid with a polyhydric alcohol having a molecular weight of 500–3,000, and reactivity of an olefinic bond of 230 to 400 and an acid number of 20 to 50
(b) a vinyl monomer copolymerizable with the polyester
(c) a filler
(d) a catalyst
(e) a copolymer of 65–82 weight percent α-methyl styrene and 35 to 18 weight percent acrylonitrile having a molecular weight of 50,000 to 500,000 wherein the ratio of the polyester to the vinyl monomer to the copolymer is in the range of 10 to 80:10 to 70:3 to 50.

References Cited

UNITED STATES PATENTS

| | | | |
|---|---|---|---|
| 2,498,621 | 2/1950 | Kropa et al. | 260—2.5 |
| 3,227,665 | 1/1966 | Fourcade et al. | 260—2.5 |
| 3,503,921 | 3/1970 | Souza et al. | 260—40 |
| 3,701,748 | 10/1972 | Kroekel | 260—40 |

WILLIAM H. SHORT, Primary Examiner
E. A. NIELSEN, Assistant Examiner

U.S. Cl. X.R.

260—862